United States Patent
Lawson

(10) Patent No.: US 7,325,037 B2
(45) Date of Patent: Jan. 29, 2008

(54) METHOD AND SYSTEM FOR CLIENT-BASED ADAPTIVE NETWORKING SYSTEM

(75) Inventor: Karen L. Lawson, Northwood (GB)

(73) Assignee: Eastman Kodak Company, Rochester, NY (US)

( * ) Notice: Subject to any disclaimer, the term of this patent is extended or adjusted under 35 U.S.C. 154(b) by 972 days.

(21) Appl. No.: 10/373,267

(22) Filed: Feb. 24, 2003

(65) Prior Publication Data
US 2003/0182432 A1    Sep. 25, 2003

(30) Foreign Application Priority Data
Feb. 27, 2002    (GB) ................... 0204530.0

(51) Int. Cl.
*G06F 15/16*    (2006.01)
(52) U.S. Cl. .............. 709/207; 709/203; 709/224; 709/227
(58) Field of Classification Search ............ 709/203, 709/207, 223, 224, 246
See application file for complete search history.

(56) References Cited

U.S. PATENT DOCUMENTS 6,078,953 A    6/2000  Vaid et al.
6,141,686 A    10/2000 Jackowski et al.
6,247,050 B1 *  6/2001 Tso et al. ................... 709/224

FOREIGN PATENT DOCUMENTS

EP    0 994 602    4/2000
WO    00/36793     6/2000

OTHER PUBLICATIONS

A Scalable, High Performance Active Network Node; Decasper et al.; IEEE Network.
A Programmable Router Architecture Supporting Control Plane Extensibility; Gao et al.; IEEE communications Magazine, pp. 152-158; Mar. 2000.

* cited by examiner

*Primary Examiner*—Yves Dalencourt
(74) *Attorney, Agent, or Firm*—Frank Pincelli

(57) ABSTRACT

A method for controlling the transmission of data between a client computer system and the internet network wherein the client computer system intelligently matches the demand and supply of the available bandwidth based on client/user preferences and network preferences.

6 Claims, 2 Drawing Sheets

METHOD AND SYSTEM FOR CLIENT-BASED ADAPTIVE NETWORKING SYSTEM

CROSS REFERENCE TO RELATED APPLICATIONS

This is a U.S. original patent application which claims priority on Great Britain patent application No. 0204530.0 filed Feb. 27, 2002.

FIELD OF THE INVENTION

This invention relates to the field of computer system communication networks.

BACKGROUND OF THE INVENTION

Computer systems linked to each other in a communication network, i.e. the Internet, are used by both business users and individual users. The current usage model of the Internet operates on a "request-response" architectural framework. A user connects to the internet infrastructure and requests information via their client device from any number of servers around the world. A client device can be a networked personal computer, personal digital assistant, or any other computation device with network capability. In the current network model, requests and responses flow between clients/users and servers via routers and switching devices. There is little user control over how the network connection operates or when it is operational.

New forms of Internet connectivity are emerging. One form of connection which is becoming popular is the broadband persistent connection. The broadband connection allows transmission speeds greater than 2 million bits per second and also allows a continuous connection i.e. twenty four hours a day, seven days a week. This type of connection is called "always on" and it operates much like current telephony access.

Currently there is little advantage in having an internet connection available for twenty four hours, seven days a week due to the request-response nature of the network. Today, the user must be present at their device in order to receive service. The ability to tailor the network service to the needs of the user is extremely limited.

The current use of the Internet limits the user's ability to interact directly with the network services and data transmission function found as a part of their client device. The client device operating system controls network interaction using predominately real-time, first in first out (FIFO) queuing mechanisms. As the computational capabilities of the client devices and the network infrastructure itself evolves, there is an opportunity to improve performance and user experience by distributing control plane functionality to the client device. In this instance, control plane is defined as the set of functions which control the operational characteristics of the network transmission between a client and a server. While this term is used widely within the network component technology area, this invention extends this concept to include the control of networking services found within the client device operating system itself. See Gao, J., Steenkiste, P., Takahashi, E., and Fisher, A., "A Programmable Router Supporting Control Plane Extensibility", IEEE Communications Magazine, pp. 152-158, March 2000. Control plane functions are found in networking router devices which, for example, routes datagrams or "packets" of information from a source to its destination. Control plane functions relevant to this invention are congestion control, queuing and resource management. For the purpose of this invention, packets are defined as information in a standard format and length which contain a header section of identifying information and a data section which is either user data or network control data.

The combination of embedded control plane functions within the client device coupled with end user preferences provides the means to effectively use "always on" Internet connections without direct user interaction.

SUMMARY OF THE INVENTION

The present invention is a software extension to the current known client-side networking architecture. It allows the intelligent control of network bandwidth based on both input from the user and input from the control plane of the network itself.

According to the present invention there is provided a method of controlling the transmission of data between a client computer system and the internet network, the client computer system intelligently matching the demand and supply of the available bandwidth based on client/user preference and network performance.

More specifically the invention provides a method comprising the steps of;
  registering an application with a communication registry;
  identifying the media type of the application and assigning a unique application creating an identifier to each application;
  identifying whether the application is real time or queuable;
  assigning a priority rating to the application;
  intercepting the transmission of the application;
  queuing the application at an appropriate transmission category queue;
  monitoring the queues and measuring a demand variable;
  measuring a current congestion state at intervals and inputting said measured congestion states into an image engine profiler;
  analyzing the measured current congestion states to provide a congestion state forecast;
  calculating the appropriate number of network sockets to handle the demand against the congestion;
  creating the appropriate number of network sockets and transmitting the application data through an internet network connection according to priority and supply of bandwidth.

The invention further provides a system for controlling the transmission of data between a client computer and the internet network, the system including an applications communications registry, a network queue demand monitor, a network engine profiler and a number of dynamic network transmission meters implemented as software.

The present invention allows the user to specify the parameters of interest for network control. It allows the user to specify the handling and scheduling of network activity from their client device based on categories of transmission. The system of the invention allows appropriate and controllable use of resources which otherwise might lay dormant, i.e. the "always on" connection while a user is sleeping. The system allows applications to be batched and scheduled to be processed later.

Due to the nature of this system, specific content media types generated from user applications can be scheduled and transmitted in different ways. For example, images or image-based application data can be treated differently during transmission across the Internet than textual data if the user so chooses.

BRIEF DESCRIPTION OF THE DRAWINGS

The invention will now be described, by way of example, with reference to the accompanying drawings, in which.

DETAILED DESCRIPTION OF THE INVENTION

Figure 1:
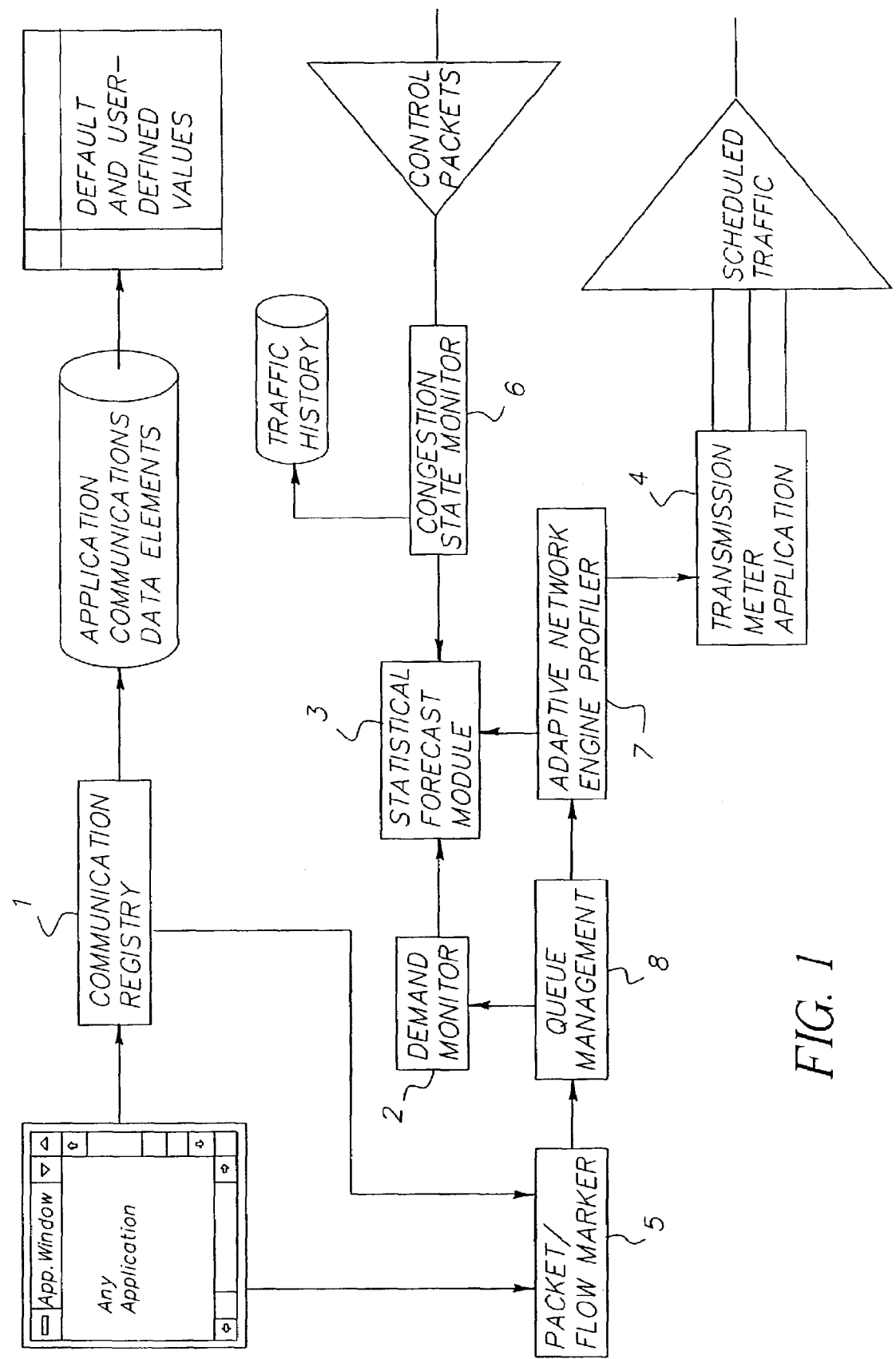
FIG. 1 is a schematic diagram indicating the key components of the system of the invention.

FIG. 1 illustrates the key components, or modules, of the system. These are an application communications registry 1, a network queue demand monitor 2, a network engine profiler 3, a number of dynamic network transmission software meters 4, a packet marker 5, a congestion state monitor 6, a forecast module 7, and a queue manager 8. The function of these components will be described below.

The present invention provides a network application between a client/user's computer and the internet, i.e. a "meter" which can control the flow of requests and responses. All requests are sent out from the client computer operating system in a serial manner, but the requests go out to the network at different times dependent on the nature of the request and the availability of bandwidth. Requests are queued according to priorities and can then be sent when sufficient bandwidth is available. The supply of bandwidth is matched to the demand, i.e. to the requests.

The system of the invention is designated as the "adaptive networking engine" and is for use with the client/user side of the internet infrastructure. It sits between the client computer operating system and the traditional networking stack, i.e. TCP/IP. The system of the invention requires the use of the Internet Protocol or IP-based network infrastructure. Upon installation of the adaptive network engine system, the user may specify specific applications that will interoperate with it. The user may also specify that the system of the invention search for all applications which may be used to interoperate with it. The system of the invention will indicate networking communication requirements for all registered applications. These requirements will be entered into the application communications registry 1. This registry takes the form of a simple indexed list. This list is maintained by the client computer operating system and includes a set of data elements which apply to each application. The data elements associated with each registered application is user extensible. The standard set envisioned are priority of traffic and time of day. At a minimum the list will include a generic application category which will apply to all non-registered applications.

The first step of the invention is to register an application with the application communications registry 1. The applications, or requests, could for example be requests, for sending out pictures, watching a movie or scheduling a virus update. It will be understood that these are examples only. The media type of each registered application is then identified, i.e. is the media text or images, a unique application identifier assigned to each registered application. The category of the application is then identified, i.e. whether the application is real time or queueable. Using the examples of applications described above, a request for a movie will be a real-time application, sending out pictures could be done when the user is not at the client computer and therefore can be queueable.

Each application or request takes the form of a datagram packet which contains a specific descriptive header and a certain amount of user data. Each packet is given a priority of high, medium or low. Alternatively the value may be provided by the network service provider such as an Internet services provider or telecommunications company. A packet marker 5 marks whether a packet has a high, medium or low priority.

Optionally, the nature of the media created by this application may be determined at this point, i.e. whether it is elastic or inelastic media. This however is not an essential feature of the invention. Elastic media can be altered within the network to suit current load or traffic conditions. Elastic media can be, for example, JPEG 2000, which can be adapted to fit available bandwidth. Inelastic media cannot be modified whilst en route. An example of inelastic media is standard image file formats, such as GIF.

The network socket is the principle method of communication between the client operating system and the client networking hardware. The system of the invention intercepts all network transmissions at the time of network socket creation. Once intercepted the system examines the source application and locates the record in the communication registry table described above. Based on the profile, i.e. priority, entry of the sending applications, a marker is created and each packet included in that request is marked with this information. These marks are included in the header extension of the packet header and are written as the network packets are produced. If no record or if the generic record is found the packets are not marked.

All packets are then queued for transmission whether marked or not. The dynamic network transmission meters 4 manage the software threads created dynamically for each queue. A set of multi-threading, asynchronous socket processes is set up at the start of the system on the client computer. There is a direct correlation between the number of threads, or processes, operating and the demand in each queue. Each process corresponds to a queue within the system. Each process must have at least one thread tied to one asynchronous socket for transmission. For higher demand the system of the invention will initiate more threads based on a demand variable. The demand variable is described below. The system of the invention will also put an operating thread on hold in order to properly transmit prioritized traffic, thus limiting in some case bandwidth for one type of traffic in favor of another. There are four categories of transmission and receipt, each represented by a queue. These queues are managed by queue manager 8. The categories are inbound and outbound batch and inbound and outbound real time. These queues take the form of a list of packet header identifiers or "pointers" in the appropriate transmission category queue. The system of the invention therefore maintains four lists of pointers to each packet queued for transmission.

A demand monitor application module 2 is run continuously in the memory of the client device. It is initiated at the start up of the client computer or at the first entry to any of the four queues described above. The monitor constantly scans the queues measuring a demand variable. These demand variables are demands for service. At regular intervals the demand variable produces the "current demand" variable. The intervals may be set by default or by the user.

The network engine profiler 3 runs an application continuously in the memory of the client device. This software component provides the function to programmatically resolve the demand against the forecasted availability in a prioritized manner. The current congestion state is measured via a standard control packet received at the client computer in the inbound real-time queue, for example the receipt of the RTCP. The measured current congestion state is the principle input into the network engine profiler 3. The current congestion state is a report of the time it takes to get to the next router on the way to a destination server. This information gives some indication of the congestion already experienced by any traffic leaving the client domain. The system of the invention uses a series of these durations to forecast the available bandwidth to that next router.

Upon receipt of a control packet as defined above the performance information from the packet is stored in an ordered list which is keyed on the packet received timestamp found in the packet header. This performance information is maintained as input to a forecasting module 7. A separate congestion forecast statistical algorithm is continuously run on a time period. The time period may be specified by either the user or predefined by the system itself.

The forecasted congestion variable and the demand variable for each queue are analyzed by the network engine profiler 3 through a proprietary algorithm. This algorithm reconciles the congestion against the demand queue values and provides the meter setting for the network transmission. Given a time of day element is included in the set up of the sending application within the application communications registry 1, the system of the invention can prioritize these packets to be sent at that time of day.

Once enabled the system of the invention can prioritize the transmission of packets through the software metering interface to meet delivery requirements such as time of day or based on priority versus congestion state.

The transmission meter 4 runs an application responsible for creating, managing and reacting to the proper number of threads required for each type of transmission queue. The meter application receives the demand variable and creates additional threads for queues which have a high demand variable based on their prioritized traffic. These additional threads will acquire more bandwidth for the transmission of the packets from the specific queues. If the network congestion and demand queues evaluate to a condition where only one queue of the outbound batch queue can function properly then the transmission meter application will place other queue threads in a hold state until such time as the network profiler 3 indicates a new meter setting.

The threads are started and fed by the categorized queues based on the demand values. Each thread is a execution environment created by the client operating system. If real time transmission is requested then the packets satisfying this category will be fed to the connection based on the number of threads as determined by the meter application.

In this way all queued network transmissions will be sent regardless of direct user involvement.

As a result of the direct linkage between the media type and the user application, the system could differentiate between e.g. JPEG 2000, MPEG, MJPEG outbound media, and set priorities accordingly. However, this is not essential to the function of the invention.

Figure 2:
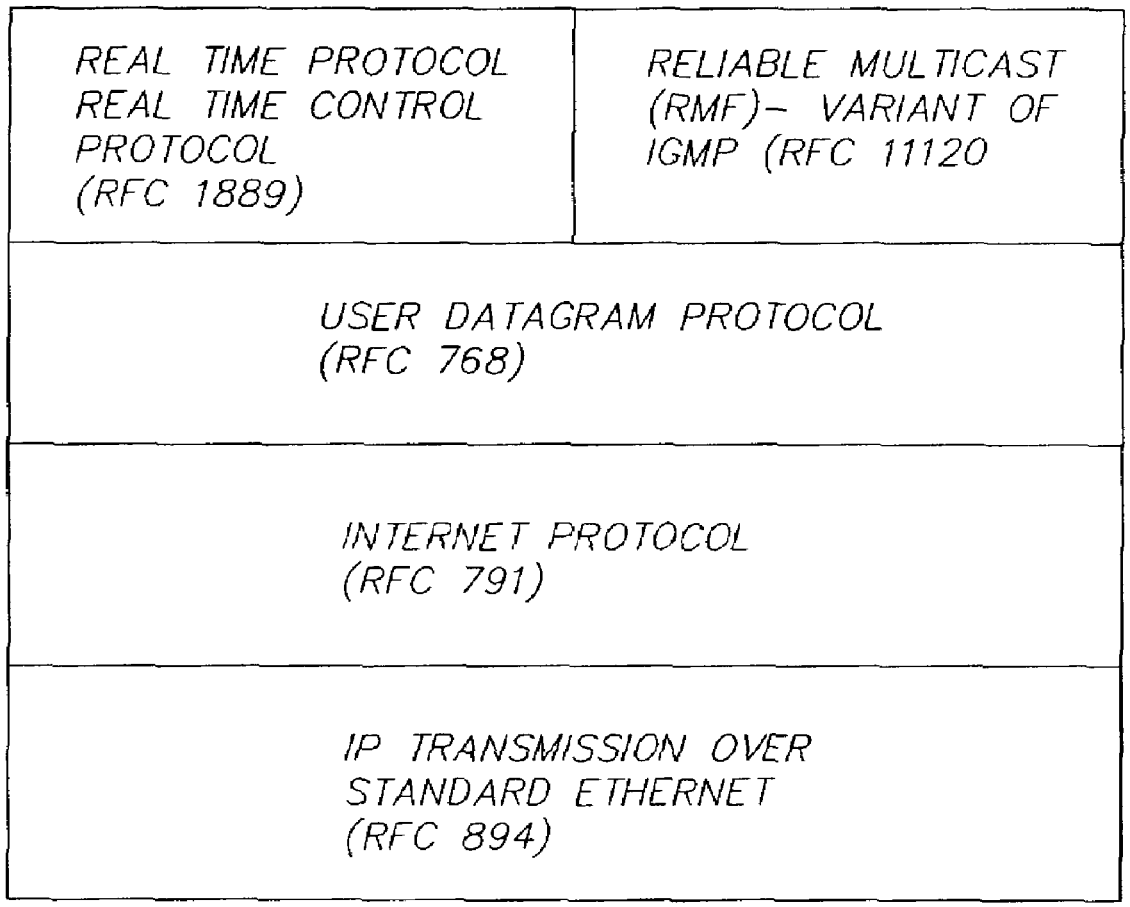
FIG. 2 is a diagram illustrating the underlying structure required to run the system.

The underlying structure of the network required to run the system of the invention is indicated in FIG. 2. The system as described above will function as long as the network transport layer supports the return of control packets. The system as described adheres to the industry standard protocols as defined by the Internet Engineering Task Force (IETF).

FIG. 2 illustrates the most recent "Requests for Comments" or RFC that govern the specification required for each layer with the infrastructure required for the image networking engine.

A further function of the system of the invention is to support the implementation of active networking in the public internet. The system resulting from the invention as described will enable the operation of an active network using the active node concept as described in DeCasper, D., Parulkar, G., Choi, S., Dehart, J., Wolf, T., and Plattner, B., "A Scalable, High Performance Active Network Node", IEEE Network, Vol 13, No. 1, 1999. The system as described will mark packets in accordance with user preferences. An Internet service provider could offer a service which recognizes that marking and provides a specific service based on that mark. This would require a service negotiation between the client and the Internet service provider to align the values of the packet marking with the network service to be provided.

The system of the invention can be modified to enable a user to view a graphical representation of the networking transmission engine and its operation.

This is not essential to the operation of the invention.

A further feature is a wizard based approach to configuring the user parameters of interest and the inclusion of new parameters of interest in terms of scheduling of transmission.

All user functions of the invention are implemented as browser based applications which use Java 1.2 components to implement the code. The present invention is compatible with standards currently in use.

PARTS LIST

1 communications registry
2 demand monitor
3 network engine profiler
4 transmission meter
5 packet marker
6 congestion state monitor
7 forecast module
8 queue manager

What is claimed is:

1. A method of controlling the transmission of data between a client computer system and the internet network, the client computer system intelligently matching the demand and supply of the available bandwidth based on client/user preference and network performance comprising the steps of;

registering an application with a communication registry;
identifying the media type of the application and assigning a unique application creating an identifier to each application;
identifying whether the application is real time or queueable;
assigning a priority rating to the application;
intercepting the transmission of the application;
queuing the application at an appropriate transmission category queue;
monitoring the queues and measuring a demand variable;
measuring a current congestion state at intervals and inputting said measured current congestion state into an image engine profiler;

analyzing the measured current congestion state to provide a congestion state forecast;

calculating the appropriate number of network sockets to handle the demand against the congestion; and creating the appropriate number of network sockets and transmitting the application data through an internet network connection according to priority and supply of bandwidth.

2. A method as claimed in claim 1 wherein the demand variable is measured at regular intervals.

3. A method as claimed in claim 2 wherein the intervals are set by the user.

4. A method as claimed in claim 1 including the step of determining the elastic nature of the media and, if necessary, modifying the media for transmission.

5. A system for controlling the transmission of data between a client computer and the internet network, the system including means for registering an application with a communication registry;

means for identifying the media type of the application and assigning a unique application identifier to each application;

means for creating an identifier to each application;

means for identifying whether the application is real time or queuable;

means for assigning a priority rating to the application;

means for intercepting the transmission of the application;

means for queuing the application at an appropriate transmission category queue;

means for monitoring the queues and measuring a demand variable;

means for measuring a current congestion state at intervals and inputting said measured current congestion state into an image engine profiler;

means for analyzing the measured current congestion state to provide a congestion state forecast;

means for calculating the appropriate number of network sockets to handle the demand against the congestion;

means for creating the appropriate number of network sockets;

and means for transmitting the application through a metered interface with an internet network according to priority and supply of bandwidth.

6. A network based system for controlling the transmission of applications based on user preferences and network performance, including a server and a system according to claim 5.

* * * * *